(12) United States Patent
Atherton et al.

(10) Patent No.: US 8,162,090 B2
(45) Date of Patent: Apr. 24, 2012

(54) POWERED FOLDABLE SCOOTER

(76) Inventors: Paul Atherton, Campbell River (CA);
Andrew Graham, Brentwood Bay (CA);
Kurt Walas, Sooke (CA)

( * ) Notice: Subject to any disclaimer, the term of this patent is extended or adjusted under 35 U.S.C. 154(b) by 202 days.

(21) Appl. No.: 12/299,991

(22) PCT Filed: May 8, 2007

(86) PCT No.: PCT/CA2007/000799
§ 371 (c)(1),
(2), (4) Date: Nov. 4, 2009

(87) PCT Pub. No.: WO2007/128124
PCT Pub. Date: Nov. 15, 2007

(65) Prior Publication Data
US 2010/0044137 A1  Feb. 25, 2010

Related U.S. Application Data

(60) Provisional application No. 60/798,320, filed on May 8, 2006.

(51) Int. Cl.
*B62D 61/00* (2006.01)
(52) U.S. Cl. ........ 180/208; 180/181; 280/287; 280/278; 280/279; 280/87.05; 280/87.041
(58) Field of Classification Search .................. 280/278, 280/87.05, 87.041, 279, 287; 180/181, 208
See application file for complete search history.

(56) References Cited

U.S. PATENT DOCUMENTS

| | | | |
|---|---|---|---|
| 3,079,172 A * | 2/1963 | Burwell | 280/278 |
| 3,314,494 A * | 4/1967 | Weitzner | 180/208 |
| 3,316,993 A * | 5/1967 | Weitzner | 180/208 |
| 4,913,252 A * | 4/1990 | Bartley et al. | 180/208 |
| 5,388,659 A | 2/1995 | Pepe | |
| 5,775,452 A | 7/1998 | Patmont | |
| 6,012,539 A | 1/2000 | Patmont | |
| 6,120,044 A | 9/2000 | Tsai | |
| 6,443,470 B1 | 9/2002 | Ulrich | |
| 6,457,544 B1 | 10/2002 | Sung | |
| 6,497,311 B2 * | 12/2002 | Tiramani et al. | 190/115 |
| 6,616,154 B1 | 9/2003 | Neuhold | |
| 7,077,229 B2 * | 7/2006 | Lee | 180/220 |

(Continued)

FOREIGN PATENT DOCUMENTS

| | | |
|---|---|---|
| CA | 676499 | 12/1963 |
| DE | 3506129 | 12/1963 |

*Primary Examiner* — Anne Marie Boehler
*Assistant Examiner* — Michael Stabley
(74) *Attorney, Agent, or Firm* — Adrian D. Battison; Ade & Company Inc.

(57) ABSTRACT

A scooter has a platform on which a rider can stand, a front wheel attached to a steering system including an upstanding handle bar and rear wheel which is driven. The scooter can be folded at a hinge line across the platform so to allow it to collapse. A case for the scooter includes a front part and a rear part covering the front and rear wheels with the parts brought together by the collapsing of the platform. This folding action also uses a pivot link to move the front and rear wheels pivoted within the respective case parts to a folded position. The steering includes a headstock with the steering bar connected to the front fork by a drive coupling which converts the rotation of the steering bar about the generally vertical axis to the rotation of the fork about an inclined axis.

20 Claims, 11 Drawing Sheets

U.S. PATENT DOCUMENTS

| | | | |
|---|---|---|---|
| 7,159,681 B1 * | 1/2007 | Sauve | 180/208 |
| 7,461,715 B1 * | 12/2008 | Tsai | 180/208 |
| 7,793,949 B2 * | 9/2010 | Wang | 280/37 |
| 7,832,517 B2 * | 11/2010 | Tsai | 180/220 |
| 7,886,855 B2 * | 2/2011 | Wang | 180/65.1 |
| 7,967,095 B2 * | 6/2011 | Kosco et al. | 180/208 |
| 2005/0077097 A1 * | 4/2005 | Kosco et al. | 180/208 |
| 2009/0295127 A1 * | 12/2009 | Wang | 280/639 |

* cited by examiner

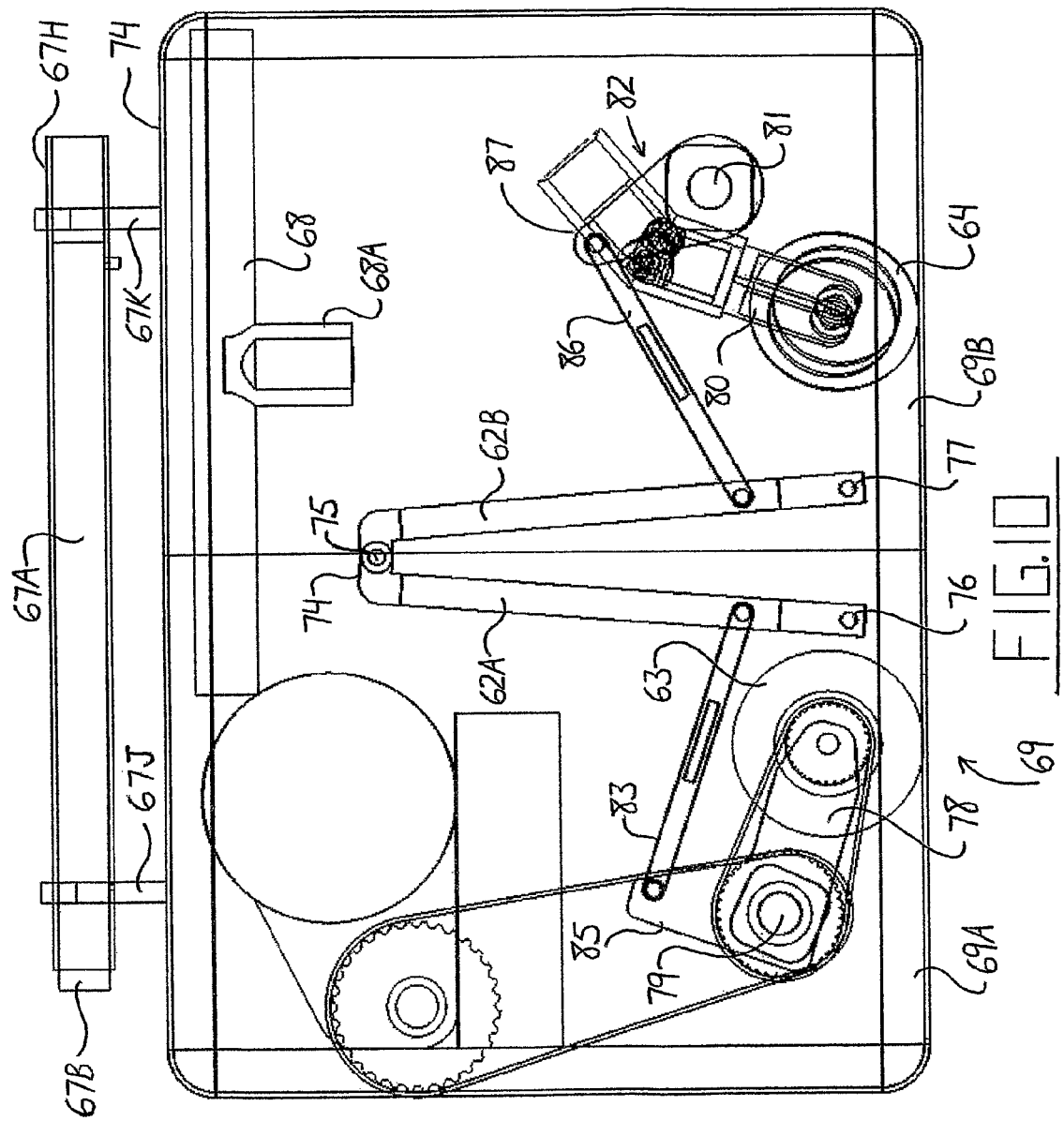

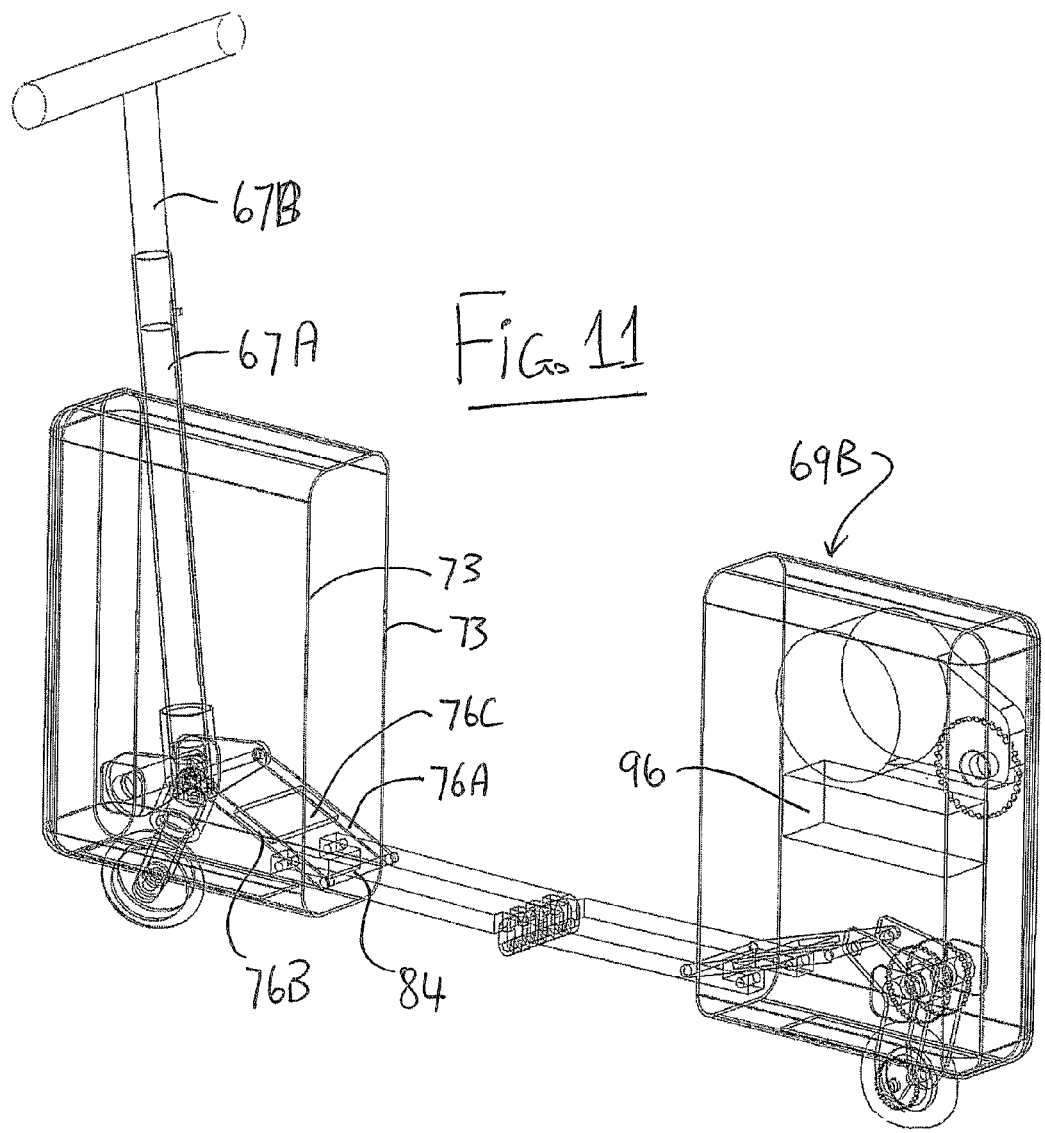

POWERED FOLDABLE SCOOTER

This application claims the benefit under 35 USC 119 from Provisional Application 60/798,320 filed May 8, 2006.

This invention relates to a folding scooter having a platform on which a rider can stand, a front wheel attached to a steering system including an upstanding handle bar and rear wheel which may be driven.

BACKGROUND OF THE INVENTION

There are many designs of simple scooter of the above type which are arranged to be ridden by a rider for low speed personal transportation, many of which can be folded and many of which are driven, commonly by a small electric motor driving the rear wheel. Examples are shown in the following patents and also further commercially available devices of this type are identified in the table set out hereinafter.

U.S. Pat. No. 5,775,452 (Patmont) issued Jul. 7, 1998 discloses a scooter of this type with a driven rear wheel and a steered front wheel with batteries located on either side of a central frame member underneath the platform.

U.S. Pat. No. 6,012,539 (Patmont) issued Jan. 11, 2000 discloses a more rugged construction scooter of this type with a driven rear wheel and a steered front which can be collapsed and folded into a container by folding down the steering bar.

U.S. Pat. No. 5,388,659 (Pepe) issued Feb. 14, 1995 discloses a scooter of this type with a rear wheel driven by a gasoline powered engine and a steered front wheel where the steering bar can be folded down onto the platform.

U.S. Pat. No. 6,457,544 (Sung) issued Oct. 1, 2002 discloses a scooter of this type with a rear wheel driven by a motor contained within a housing at the rear of the platform where the whole structure can be contained within the housing when folded.

SUMMARY OF THE INVENTION

It is one object of the invention to provide a foldable scooter for personal transport.

According to one aspect of the invention there is provided a scooter comprising:

a platform for receiving at least one foot of a rider standing on the platform;

a front wheel for supporting a forward end of the platform;

a rear wheel for supporting a rearward end of the platform;

a steering mounting for supporting the front wheel for steering movement relative to the platform;

a steering bar having a transverse handle bar at the top and standing upwardly from a position adjacent a front of the platform and connected to the steering mounting so that rotational movement of the steering bar applied by the rider to the handle bar causes the steering movement of the front wheel;

the platform including a front part and a rear part connected by a transverse hinge thereacross which allows the rear part to be folded relative to the front part through an angle of the order of 180 degrees from an operating position generally co-planar with the front part to a folded position generally parallel to the front part.

Preferably the platform is carried on a frame formed by longitudinally extending frame members which has a front part of the frame carrying the front part of the platform and a rear part of the frame carrying the rear part of the platform, the rear end of the front part of the frame being connected to the front end of the rear part by a transverse pivot axle.

Preferably the upright steering bar is collapsible. This can be achieved by folding but more simply for storage within a housing which can be done by separating the bar into separate pieces.

Preferably the steering bar is mounted in a headstock at its lower end supporting the steering bar for rotation about a generally vertical axis and wherein the front wheel is mounted in a front fork which is inclined forwardly and downwardly from the headstock to the axle of the front wheel which is mounted forwardly of headstock with the front fork pivotal in a steering action about an axis longitudinal to the fork at an angle inclined downwardly and forwardly relative to the generally vertical axis of the steering bar and wherein the steering bar is connected to the fork by a drive coupling which converts the rotation of the steering bar about the generally vertical axis to the rotation of the fork about the inclined axis.

In one arrangement of the above type, the drive coupling includes a thrust bearing.

In another arrangement of the above type, the drive coupling includes a universal joint.

Preferably the inclined angle is between 30 and 60 degrees.

Preferably there is provided a front case portion having a hollow interior for receiving the rear wheel and a rear part of the platform and a rear case portion having a hollow interior for receiving the front wheel, the steering mounting and a front part of the platform, wherein the front and rear case portions are movable between an erected position in which the front and rear case portions are spaced to expose a center part of the platform on which the rider can stand and a folded position in which the front and rear case portions are brought together to form a common case structure containing the scooter for transportation. However other folding arrangements and other housing arrangements can also be used.

Preferably the front and rear case portions each have an opening facing toward the other of the front and rear case portions so that in the folded position the openings are brought together and closed.

Preferably the rear part of the platform is mounted for pivotal movement around a pivot axis defined on the rear case portion and wherein the front part of the platform is mounted for pivotal movement around a pivot axis defined on the front case portion.

Preferably the rear wheel is mounted on a rear wheel mounting member pivotally mounted on the rear case portion at a rear pivot axis and wherein there is provided a link between the rear part of the platform and the rear wheel mounting member such that the pivotal movement of the rear part of the platform relative to the rear case portion causes the link to effect pivotal movement of the rear wheel around the rear pivot axis to a folded position within the rear case portion; and wherein the front wheel is mounted on a front wheel mounting member pivotally mounted on the front case portion at a front pivot axis and wherein there is provided a link between the front part of the platform and the front wheel mounting member such that the pivotal movement of the front part of the platform relative to the front case portion causes the link to effect pivotal movement of the front wheel around the front pivot axis to a folded position within the front case portion.

Preferably there is provided a motor which is fixed within the rear case portion and wherein there is provided a first and a second sprocket carried on the rear case portion at the rear pivot axis and the motor drives a first continuous drive member extending around the first sprocket and the wheel is driven by a second continuous drive member extending around the second sprocket.

Preferably the steering bar includes at least a portion thereof which is separable and connects to the front and rear case portion as a handle therefor.

According to a second aspect of the invention there is provided a scooter comprising:

a platform for receiving at least one foot of a rider standing on the platform;

a front wheel for supporting a forward end of the platform;

a rear wheel for supporting a rearward end of the platform;

a steering mounting for supporting the front wheel for steering movement relative to the platform;

a steering bar having a transverse handle bar at the top and standing upwardly from a position adjacent a front of the platform and connected to the steering mounting so that rotational movement of the steering bar applied by the rider to the handle bar causes the steering movement of the front wheel;

wherein the steering bar is mounted in a headstock at its lower end supporting the steering bar for rotation about a generally vertical axis and wherein the front wheel is mounted in a front fork which is inclined forwardly and downwardly from the headstock to the axle of the front wheel which is mounted forwardly of headstock with the front fork pivotal in a steering action about an axis longitudinal to the fork at an angle inclined downwardly and forwardly relative to the generally vertical axis of the steering bar and wherein the steering bar is connected to the fork by a drive coupling which converts the rotation of the steering bar about the generally vertical axis to the rotation of the fork about the inclined axis.

According to a third aspect of the invention there is provided a scooter comprising:

a platform for receiving at least one foot of a rider standing on the platform;

a front wheel for supporting a forward end of the platform;

a rear wheel for supporting a rearward end of the platform;

a steering mounting for supporting the front wheel for steering movement relative to the platform;

a steering bar having a transverse handle bar at the top and standing upwardly from a position adjacent a front of the platform and connected to the steering mounting so that rotational movement of the steering bar applied by the rider to the handle bar causes the steering movement of the front wheel;

a front case portion having a hollow interior for receiving the rear wheel and a rear part of the platform;

a rear case portion having a hollow interior for receiving the front wheel, the steering mounting and a front part of the platform;

the front and rear case portions being movable between an erected position in which the front and rear case portions are spaced and expose a center part of the platform on which the rider can stand and a folded position in which the front and rear case portions are brought together to form a common case structure containing the scooter for transportation.

BRIEF DESCRIPTION OF THE DRAWINGS

One embodiment of the invention will now be described in conjunction with the accompanying drawings in which:

FIG. 10 is a side elevational view similar to that of FIG. 9 in a folded condition of the scooter.

FIG. 11 is an isometric view of the scooter of FIG. 9 in the operating position.

In the drawings like characters of reference indicate corresponding parts in the different figures.

DETAILED DESCRIPTION

Figure 1:
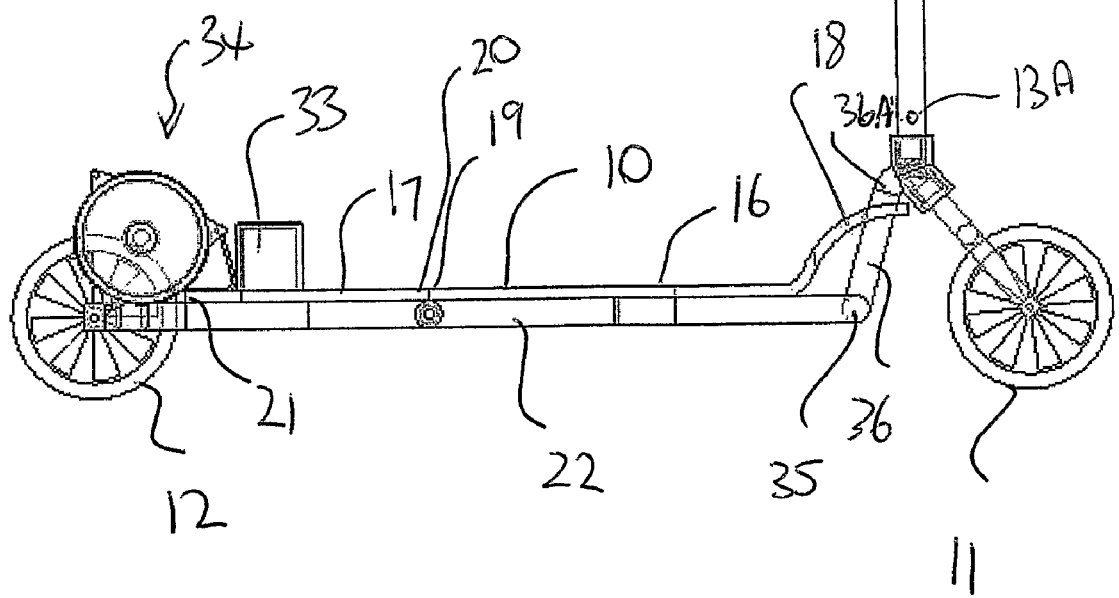
FIG. 1 is a side elevational view of one embodiment of a scooter according to the present invention.

A scooter as shown in FIG. 1 comprises a platform 10 on which the rider can stand, a front steered wheel 11 and a rear driven wheel 12. A conventional upstanding steering bar 13 is attached at the forward end of the platform 10 and stands upwardly to a height where the upper end 14 can be grasped by the rider including a transverse steering handle bar 15.

Figure 4:
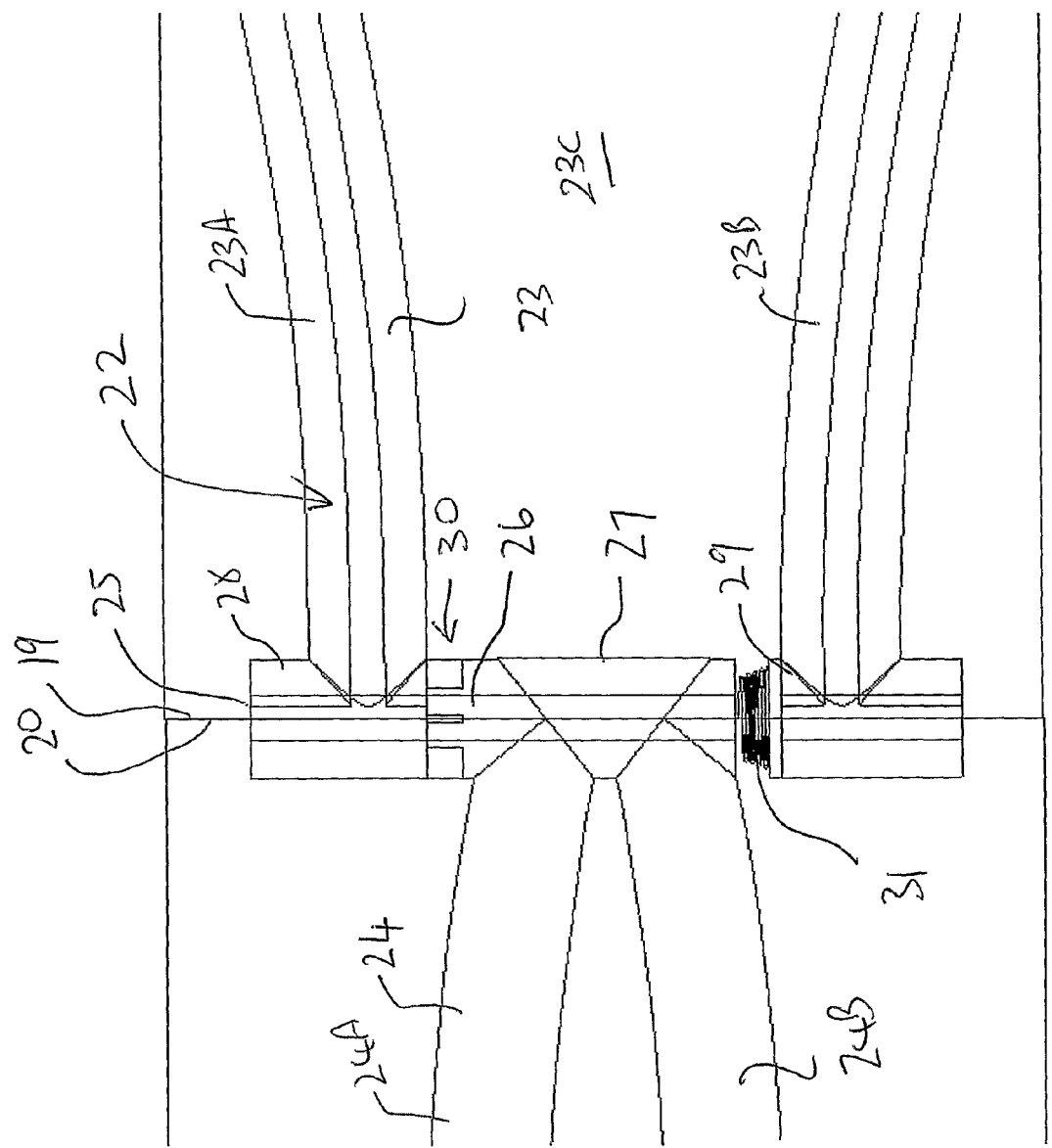
FIG. 4 is an enlarged view of the underside of the platform at the hinge.

The platform 10 includes a front portion 16 and a rear portion 17. The front portion 16 extends from an arched front section 18 at the lower end of the steering bar 13 and terminates at a rear end 19 butting a front end 20 of the rear part 17. The rear part 17 extends to a rear end 21 just in front of the wheel 12. A frame 22 is mounted on the underside of the platform and transfers loads between the platform and the wheels. The frame 22 as best shown in FIG. 4 includes a front portion 23 and a rear portion 24 connected at a hinge 25 located at the butting line between the ends 19 and 20 of the two parts of the platform. The hinge 25 includes a pivot pin or axle 26. The rear part 24 includes a collar 27 mounted on the pin 26 and the front part 23 includes two collars 28 and 29 each mounted on the pin 26. A locking arrangement generally indicated at 30 holds the frame in an operating position in a coplanar position as shown in FIG. 1 with the platform lying coplanar on top of the frame.

Figure 2:
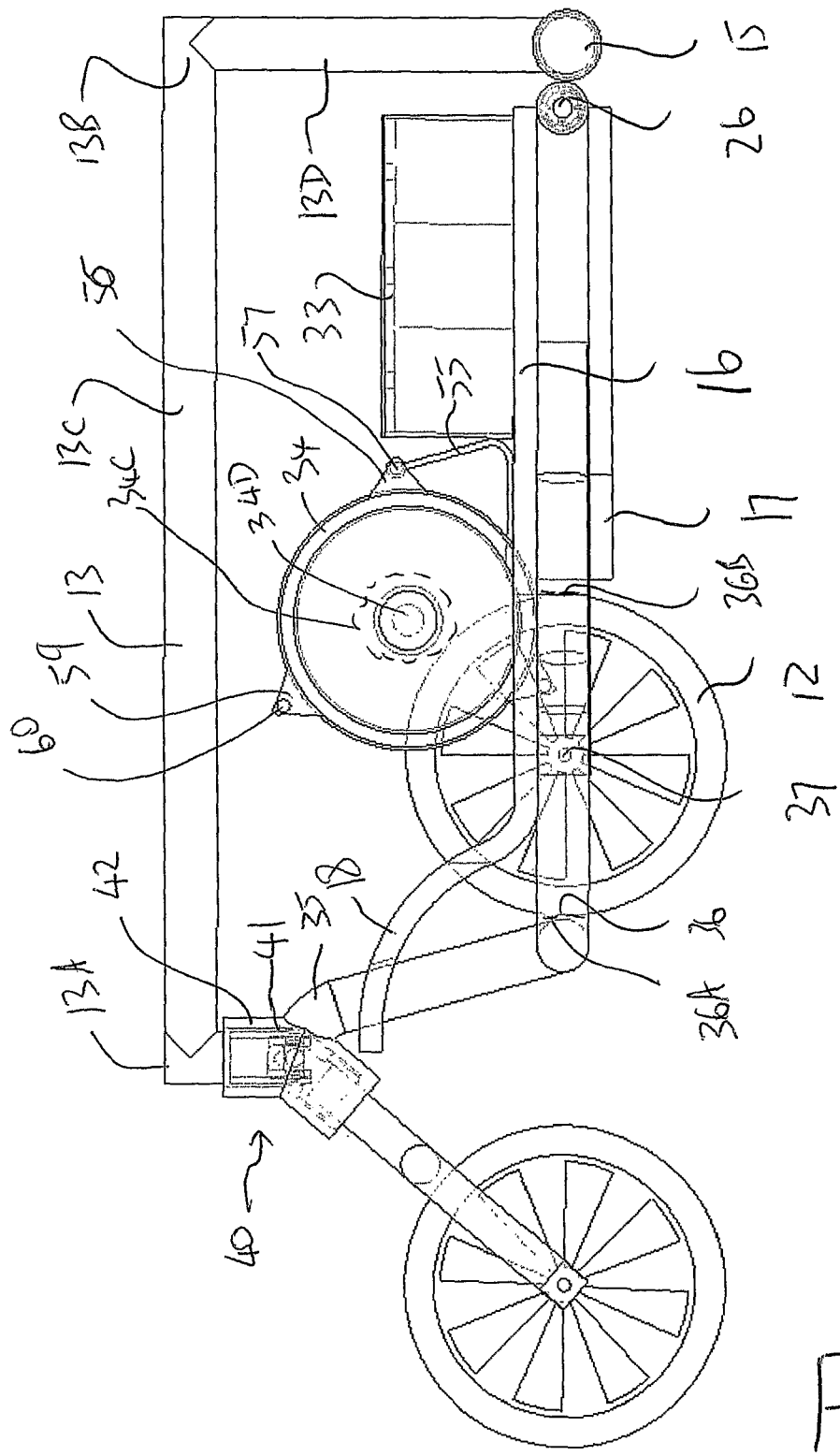
FIG. 2 is a side elevational view similar to that of FIG. 1 in a folded condition of the scooter.

The frame can pivot around the pin 26 from the position shown in FIG. 1 to the position shown in FIG. 2 which is the folded position.

As shown in FIG. 4, the frame members forming the front part 23 of the frame are spaced apart as indicated at 23A and 23B leaving an open area 23C therebetween. Thus in the folded position shown in FIG. 2, the frame members 23A and 24B of the rear frame section lie in the space 23C between the two frame members of the front part allowing the frame members to lie in a common plane in the folded position as best shown in FIG. 2. The locking arrangement 30 which is actuated by a spring 31 has two positions at which it holds the frame members locked that is the operating position shown in FIG. 1 and the folded position shown in FIG. 2.

Thus in the operating position shown in FIG. 1, the platform 10 forms a planar horizontal structure for receiving the seat of a rider and also provides a support for the battery pack 33 and for a drive motor 34. The platform is shown in more detail in FIG. 3 and includes the arched section 18 at the forward end which is supported by a transverse connecting beam 35 connecting the two frame members 23A and 23B at the forward end. The frame members at the forward end are connected to a single neck piece as indicated at 36 in FIG. 6 which extends upwardly and forwardly.

The platform has a slot 36 along the center line and aligned with the rear wheel 12 so that in the folded position shown in FIG. 2 the rear wheel 12 projects through the slot 36 which has a front end 36A and a rear end 36B. This allows the frame to fold in the coplanar position since the axle of the rear wheel 12 lies substantially in the same plane as the frame and thus requires the periphery of the wheel to project through the slot. Thus as shown in FIG. 2 the axle of the front wheel 12 as indicated at 37 lies in the same plane as the frame as slightly below the front portion 16 of the platform.

In the folded position of FIG. 2, it can also be noted that the steering bar 13 includes two hinge points 13A and 13B which allow the bar to bend at 90° at those two locations. The first hinge point 13A is located immediately above the steering system generally indicated at 40 so that the first portion 13C of the steering bar 13 extends in the folded position, parallel to the frame 22 over the platform 16 to the rear end of the platform. A second hinge point 13B is located at a position to form a second portion 13D of the steering bar which is located so that it extends downwardly to a position immediately at or adjacent to the hinge 26. Thus the transverse handle bar 15 is located across the frame at the hinge 26 thus minimizing the volume of the folded structure. Suitable hinge mechanisms are well known to a person skilled in the art which allow the steering bar 13 to fold at the hinge points as shown The steering mechanism 40 includes a headstock 41 which is attached to neck 36 at an upper end 36A and thus is held in fixed position at the front of the cross bar and thus at the front of the platform. The headstock 41 defines a first support 42 for the bar 13 allowing rotation of the bar 13 about an upright or vertical axis 44. Thus in conventional manner the rider stands in the platform with the bar in front of the rider grasping the handle bar 14 and the rider can twist the handle bar about the axis 44 to provide a steering action. The headstock 41 includes a further support 45 for a front fork 46 of the front wheel 11. The front fork 46 is rotatable in the support 45 about an axis 47 which is inclined forwardly and downwardly toward the axle 48 of the front wheel 11.

The fork 46 can be of the two sided arrangement conventionally used so that one leg extends downwardly on each side of the wheel to support the axle 48. Alternatively the fork maybe of a one sided arrangement as is well known to a person skilled in the art.

The headstock 41 and its upper and lower portions 44 and 45 provide bearings for supporting the bar 13 and the fork 46 in fixed position to hold their axes 44 and 47 at the specified angle. It will be appreciated therefore that the axis 47 extends downwardly and forwardly toward the axle 48 at an angle to the vertical. This angle can vary but in a preferred arrangement is of the order of 45° as shown. A drive coupling 50 is provided between the lower end of the bar 13 and the upper end of the fork 46 so that rotation of the bar 13 about the axis 44 is transferred into rotation of the fork about the axis 47. This arrangement is a simple mechanical arrangement which can be provided by a universal coupling or by angled or bevelled gears as will be apparent to one skilled in the art. With this design the scooter will be safer to use because the front wheel will be less responsive than the current designs where the front wheel rotates freely about the vertical axis of the bar 13. The angle forks provide a safer smoother ride in the corners.

Figure 3:
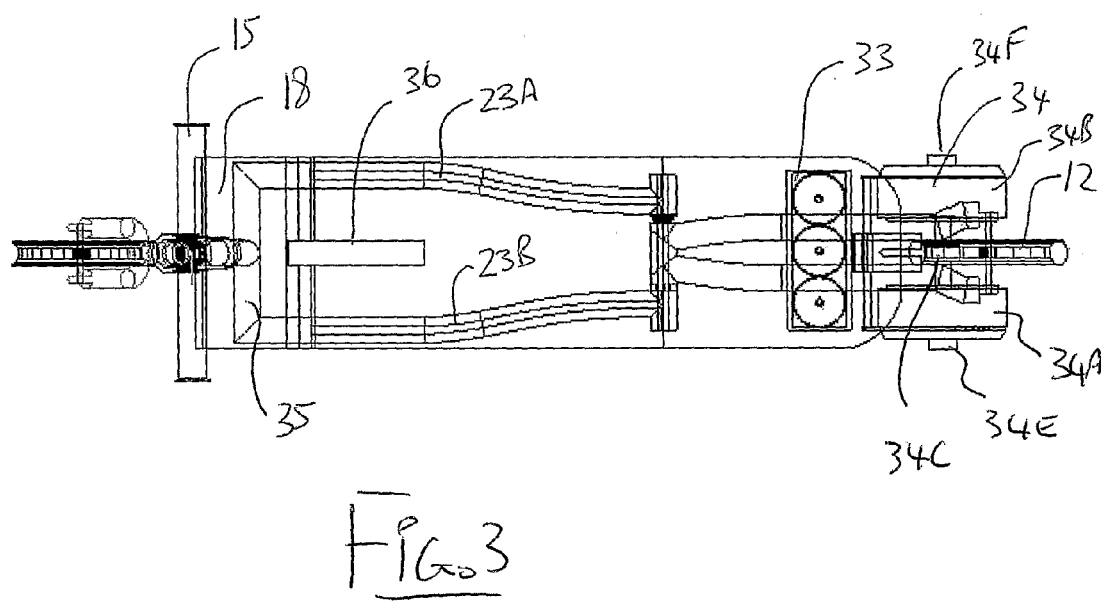
FIG. 3 is a bottom plan view partly in phantom showing the scooter in the operating position.
Figure 6:
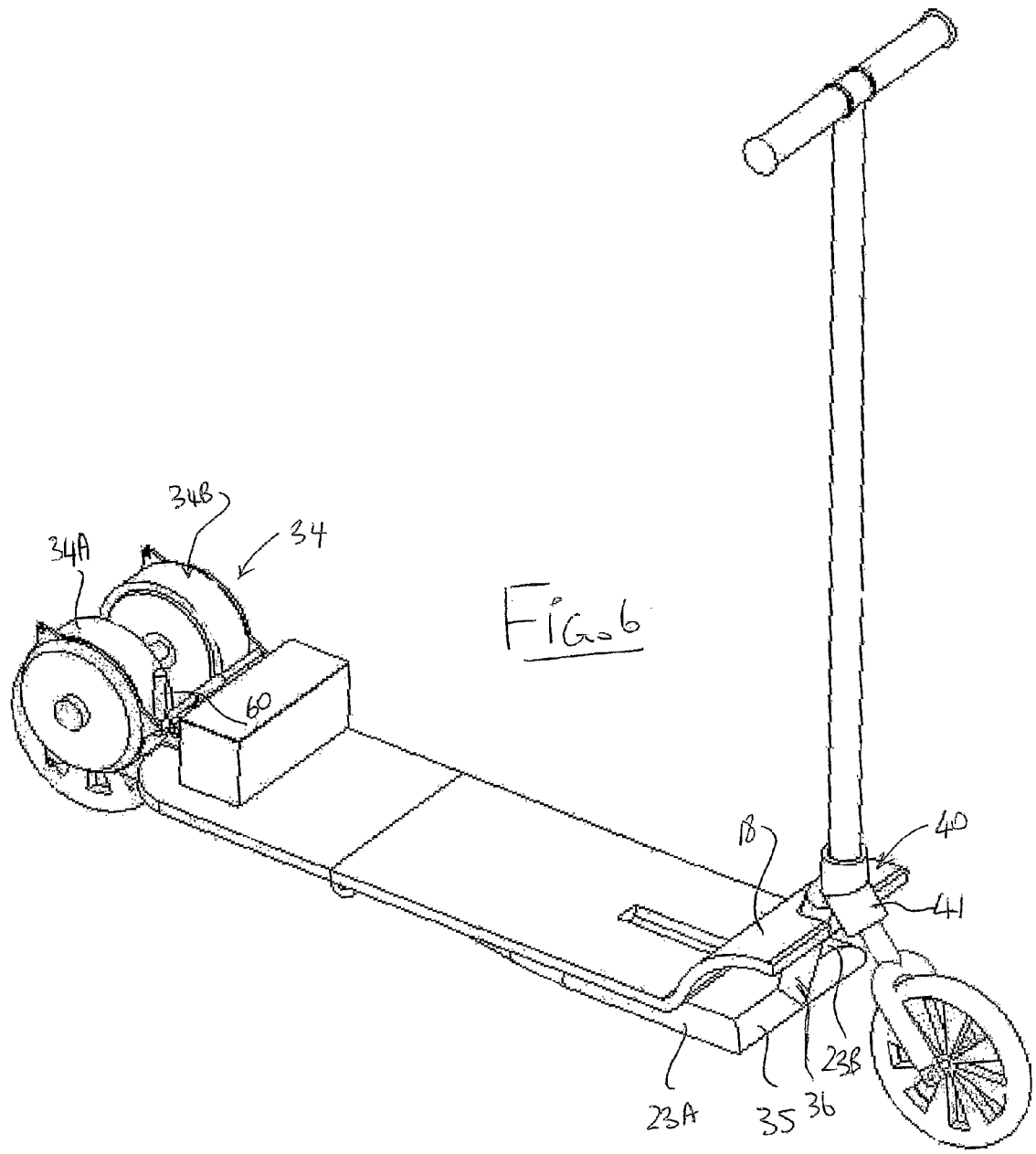
FIG. 6 is an isometric view of the scooter in the operating position.
Figure 7:
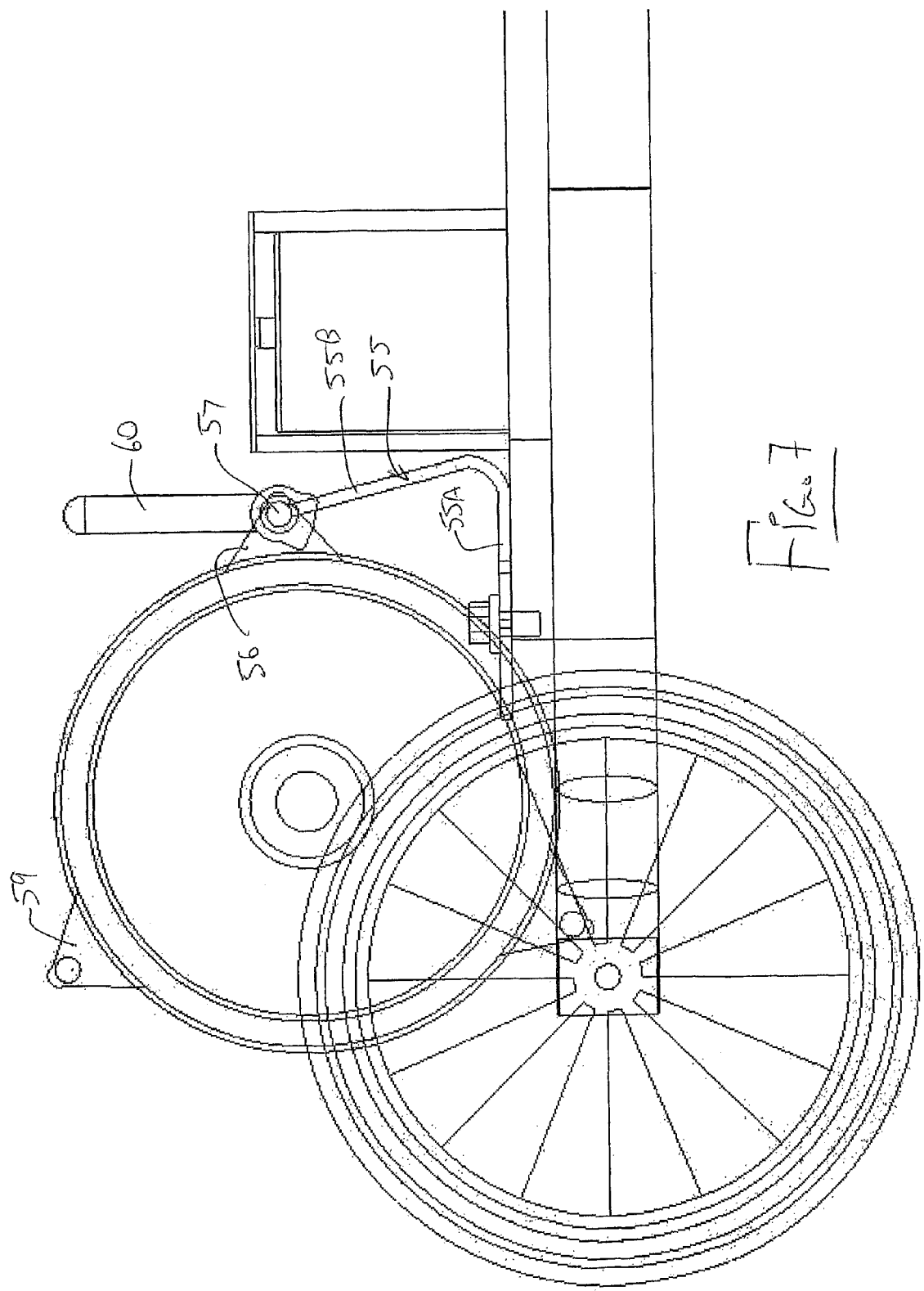
FIG. 7 is a side elevational view on an enlarged scale showing the driving motor arrangement.
Figure 8:
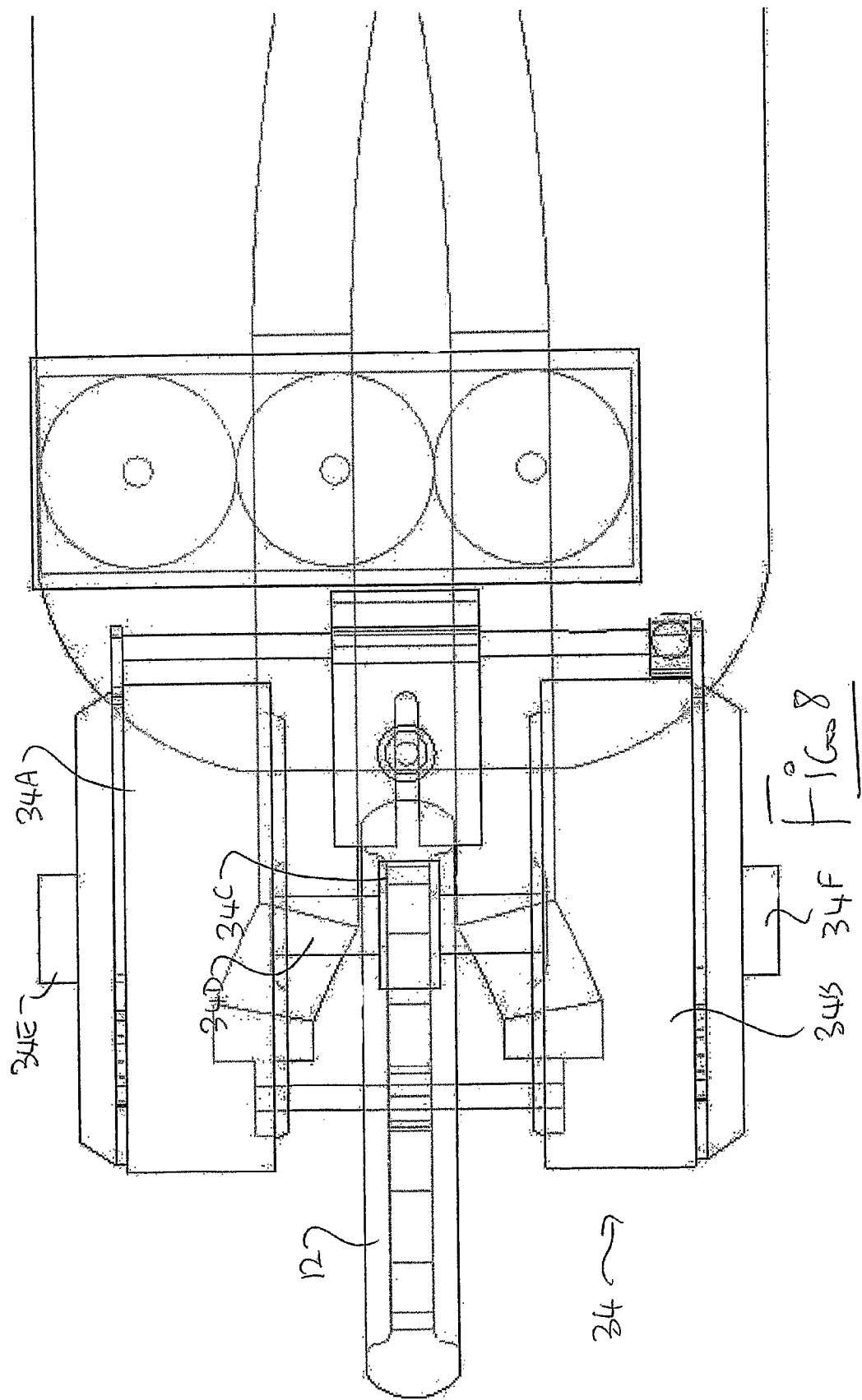
FIG. 8 is a top plan view on an enlarged scale showing the driving motor arrangement.

The drive motor arrangement 34 as shown in FIGS. 2 and 3 and as shown in more detail in FIGS. 6, 7 and 8, comprises a motor 34 which is in the form of two motor elements 34A and 34B each on a respective side of a friction drive wheel 34C. The friction drive wheel sits on the periphery of the wheel 12 and provides drive thereto. The two motor elements drive a shaft 34D carrying bearings 34E and 34F. The motor elements 34A and 34B are carried on a bracket 55 attached to the rear end of the rear platform part by a base flange 55A bolted to the platform which supports an upstanding flange 55B. The bracket 55 provides a transverse pivot pin 57 which attaches to gears 56 on the motor 34. This allows the motor and the shaft to pivot around the axis of the pivot pin 57 so that the motor can be pressed downwardly onto the wheel or lifted away from the wheel when no motor drive is required. In one arrangement gears 56 on the motor attach to a suitable spring coupling which applies a spring force biasing the motor into the wheel engagement position.

The engagement for the friction drive wheel onto the rear wheel may be provided by a spring. However in the preferred arrangement as shown there is provided a mechanical mount involving a lever 60 to engage the friction drive wheel.

Figure 9:
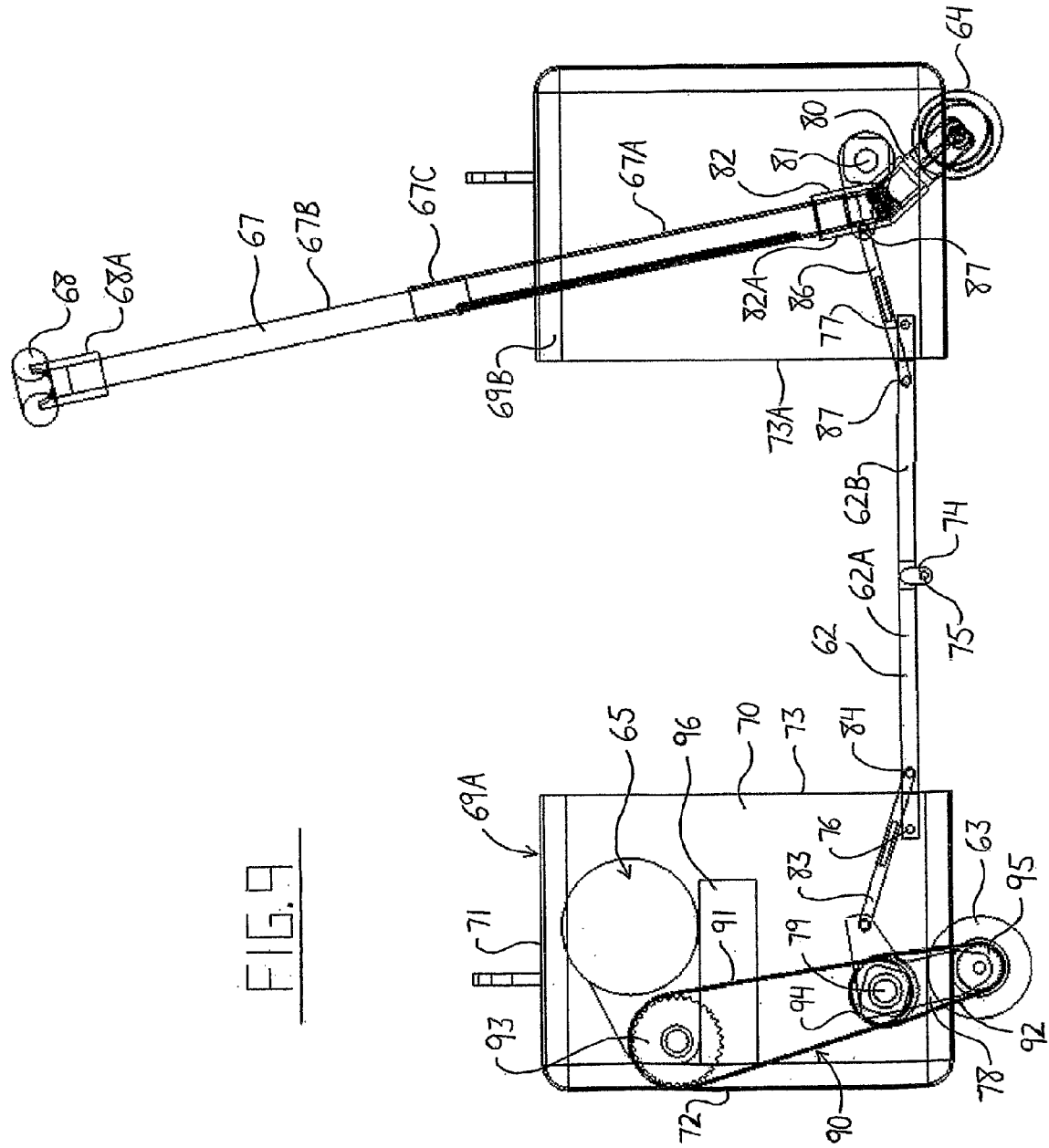
FIG. 9 is a side elevational view of a second embodiment of scooter according to the present invention which uses some of the concepts and arrangements used in the first embodiment, the scooter being shown in the erected condition ready for use.

Turning now to FIGS. 9, 10 and 11, there is shown an alternative arrangement utilizing a number of concepts as described above.

Thus a scooter 61 is shown which includes a platform 62, a rear wheel 63 for supporting a rear end of the platform and a front wheel 64 for supporting a front end of the platform. The rear wheel 63 is driven by a motor 65 to provide power to the scooter. The front wheel 64 is steered by a steering system 66 including a steering bar 67 and a cross handle bar 68.

As part of the structure, the scooter includes a case 69 which includes a rear portion 69A and a front portion 69B. As shown in FIG. 10 the case 69 when in the closed position forming a closed case is defined by the two portions 69A and 69B joined together. In the extended or erected position shown in FIG. 9, the rear portion 69A is spaced away from the front portion 69B exposing the platform 62 on which the foot or feet of the rider can be placed. Each of the parts 69A and 69B of the case 69 includes two side walls 70, a top wall 71, a rear wall 72 defining a generally rectangular structure which is rigid and provides structural strength and stability for the scooter and the components thereof as described hereinafter. A front face 73 of the part 69A of the case faces an open front face 73A of the part 69B. Thus these two parts can be brought together as shown in FIG. 10 to contain the components of the scooter therein.

The platform 62 includes a rear portion 62A and a front portion 62B hinged at a central hinge coupling 74. The hinge coupling 74 has a pivot pin 75 on the underside of the platform together with a series of support fingers which connect the pivot pin 75 to the end of the respective part of the platform. Thus the platform when in the erected position of FIG. 9 supports the front part 62B and the rear part 62A in a coplanar position with the pivot pin 75 below those planar components.

In the extended position the ends of the platform parts butt to prevent the platform from going over center and maintaining the platform in the horizontal coplanar position. However the pivot pin 75 allows the platform to fold upwardly with the pivot pin 75 moving vertically upwardly along a centre plane and acting to draw the outer ends of the platform parts inwardly toward the centre line of the scooter in a position shown in FIG. 10.

The rear end of the rear platform part 62A is pivoted on a transverse pivot pin 76 connected across the side walls 73 of the rear case part 69A. Symmetrically the front platform part 62B is connected to a pivot pin 77 extending across the side walls of the front case part. Thus the load from the rider standing on the platform is transferred into the structure of the front and rear case parts by the pivot pins 76 and 77.

The rear wheel 63 is mounted in a rear fork 78 carried on an axle 79. Symmetrically, the front wheel 64 is carried in a front fork 80 mounted on an axle 81 via a steering mounting member 82.

In the erected position, downward load from the rear case part 69A is transferred through the axle 79 extending across the side walls 73 and attached thereto into the fork 78 and from the fork into the wheel 63. A link 83 extends from a pivot pin 84 on the rear platform part to a bracket 85 attached to the fork 78. In the erected position, therefore, downward force from the platform applied to the pivot pin 76 is transferred to downward force to the axle 79 by the link 83. The link 83 prevents the axle 79 from pivoting upwardly around the pivot pin 76.

Symmetrically a front link 86 is pivoted at a pivot pin 87 on the front platform part 62B and is pivoted at its front end on a bracket 87 attached to the steering mounting 82. Thus at the front end, loads on the front part of the platform are transferred into the pivot pin 77 and the axle 81 and the wheel attached thereto are prevented from rotating about the pivot pin 77 by the link 86.

A comparison of the erected position shown in FIG. 9 and the collapsed position shown in FIG. 10 shows that the folding action of the two parts of the platform by which the pivot pin 75 is moved vertically upwardly causes the links 83 and 86 to apply pressure on the bracket 85 and the front connection 87 so as to cause rotation of the rear fork 78 and the wheel 63 carried thereby around the axle 79 and so as to cause rotation of the front fork 80 and the wheel 64 carried thereby around the axle 81. This rotational movement of the rear wheel and the front wheel is generally symmetrical and acts to retract the rear wheel and the front wheel upwardly into the area bounded by the case part 69A and 69B.

Each of the links 76 and 77 is, as best shown in FIG. 11, formed by a pair of side arms 76A and 76B connected by a stiffening brace 76C which connects the arms at a position adjacent a centre part of the arms between the front pivot pin 84 and the rear end of the arms at the respective connection bracket.

The rear wheel 63 is driven by the motor 65 through a chain or belt drive system generally indicated at 90 which includes a first drive chain 91 and a second drive chain 92. The first drive chain 91 is driven by a drive sprocket 93 of the motor. At the axle 79 is provided a second sprocket 94 driven by the chain 91 and a third sprocket which drives the second chain 92. The second chain 92 drives a force sprocket 95. The sprocket 94 is connected to a common sprocket on a common drive shaft centered around the axle 79 so that the wheel and the fork can rotate around the axle 79 without interfering with the positions of the chains 91 and 92 since those chains are carried on the same pivot axle 79 for rotation around that axle.

The motor 65 is carried on a support 96 mounted on the inside of the rear part of the case on one of the side walls 73.

The steering system 66 includes a first bar part 67A which has a lower end received in a socket 82A of the steering mounting. A second bar part 67B connects into the first part 67A at a coupling 67C. The cross bar handle 68 includes a socket 68A which engages over the upper end of the upper bar part 67B. These components can be disassembled and stored within the front case part 69B. As shown in FIG. 10, the cross bar 68 and the socket 68A are located within the case underneath the top wall 71 of the front case part. The bar 67 and the two parts 67A and 67B can slide one inside the other. These components can also be stored within the case or as shown in FIG. 10, can be mounted as a handle 67H carried at its ends within brackets 67J and 67K on the top wall of the case parts. Thus when the case parts are brought together, the bar 67 is inserted into holes in the brackets 67J, 67K and thus extends along the top of the case to provide a lifting handle by which the case containing all components of the scooter can be carried.

Figure 5:
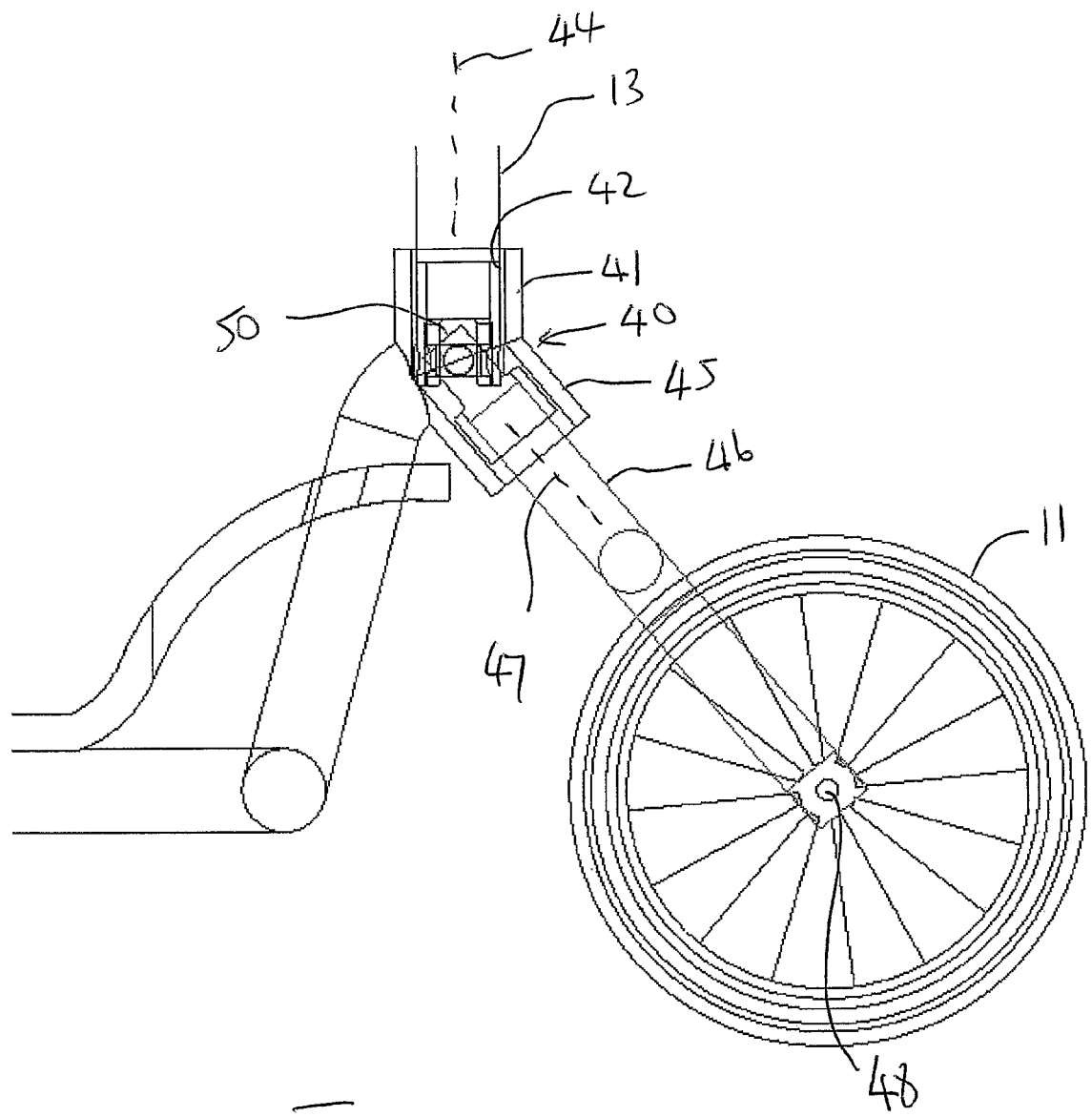
FIG. 5 is a side elevational view on an enlarged scale showing the steering arrangement.

The steering mounting 82 includes a head stock as previously described providing the angle drive arrangement as shown and described in relation to FIG. 5.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A scooter comprising:
   a platform for receiving at least one foot of a rider standing on the platform;
   a front wheel for supporting a forward end of the platform;
   a rear wheel for supporting a rearward end of the platform;
   a steering mounting for supporting the front wheel for steering movement relative to the platform;
   a steering bar having a transverse handle bar at the top and standing upwardly from a position adjacent a front of the platform and connected to the steering mounting so that rotational movement of the steering bar applied by the rider to the handle bar causes the steering movement of the front wheel;
   the platform including a front part and a rear part connected by a single transverse hinge thereacross;
   the steering mounting being rigidly connected to the front part so that the steering mounting remains in a constant position and orientation relative to the front part while the steering mounting and the front part pivot about the single transverse hinge line;
   a hub of the rear wheel being rigidly connected to the rear part so that the rear wheel remains in a constant position and orientation relative to the rear part while the rear wheel and the rear part pivot about the single transverse hinge line;
   in an operating position the front part of the platform and the rear part of the platform lying in a common plane and arranged to receive the foot of the rider;
   in a folded position the rear part of the platform and the rear wheel being folded relative to the front part of the platform and the steering mounting through an angle of the order of 180 degrees from the operating position;
   wherein the steering bar is mounted in a headstock at its lower end supporting the steering bar for rotation about a generally vertical axis and wherein the front wheel is mounted in a front fork which is inclined forwardly and downwardly from the headstock to the axle of the front wheel which is mounted forwardly of headstock with the front fork pivotal in a steering action about an axis longitudinal to the fork at an angle inclined downwardly and forwardly relative to the generally vertical axis of the steering bar and wherein the steering bar is connected to the fork by a drive coupling which converts the rotation of the steering bar about the generally vertical axis to the rotation of the fork about the inclined axis.

2. The scooter according to claim 1 wherein the platform is carried on a frame formed by longitudinally extending frame members which has a front part of the frame carrying the front part of the platform and a rear part of the frame carrying the rear part of the platform, the rear end of the front part of the frame being connected to the front end of the rear part by a transverse pivot axle.

3. The scooter according to claim 1 wherein the upright steering bar is collapsible.

4. The scooter according to claim 1 wherein the inclined angle is between 30 and 60 degrees.

5. The scooter according to claim 1 wherein there is provided a rear case portion having a hollow interior for receiving the rear wheel and a rear part of the platform and a front case portion having a hollow interior for receiving the front wheel, the steering mounting and a front part of the platform, wherein the front and rear case portions are movable between an erected position in which the front and rear case portions are spaced and expose a center part of the platform on which the rider can stand and a folded position in which the front and rear case portions are brought together to form a common case structure containing the scooter for transportation.

6. The scooter according to claim 5 wherein the front and rear case portions each have an opening facing toward the other of the front and rear case portions so that in the folded position the openings are brought together and closed.

7. The scooter according to claim 5 wherein the rear part of the platform is mounted for pivotal movement around a pivot axis defined on the rear case portion and wherein the front part of the platform is mounted for pivotal movement around a pivot axis defined on the front case portion.

8. The scooter according to claim 7 wherein the rear wheel is mounted on a rear wheel mounting member pivotally mounted on the rear case portion at a rear pivot axis and wherein there is provided a link between the rear part of the platform and the rear wheel mounting member such that the pivotal movement of the rear part of the platform relative to the rear case portion causes the link to effect pivotal movement of the rear wheel around the rear pivot axis to a folded position within the rear case portion; and wherein the front wheel is mounted on a front wheel mounting member pivotally mounted on the front case portion at a front pivot axis and wherein there is provided a link between the front part of the platform and the front wheel mounting member such that the pivotal movement of the front part of the platform relative to the front case portion causes the link to effect pivotal movement of the front wheel around the front pivot axis to a folded position within the front case portion.

9. The scooter according to claim 8 wherein there is provided a motor which is fixed within the rear case portion and wherein there is provided a first and a second sprocket carried on the rear case portion at the rear pivot axis and the motor drives a first continuous drive member extending around the first sprocket and the wheel is driven by a second continuous drive member extending around the second sprocket.

10. The scooter according to claim 5 wherein the steering bar includes at least a portion thereof which is separable and connects to the front and rear case portion as a handle.

11. A scooter comprising:
a platform for receiving at least one foot of a rider standing on the platform;
a front wheel for supporting a forward end of the platform;
a rear wheel for supporting a rearward end of the platform;
a steering mounting for supporting the front wheel for steering movement relative to the platform;
a steering bar having a transverse handle bar at the top and standing upwardly from a position adjacent a front of the platform and connected to the steering mounting so that rotational movement of the steering bar applied by the rider to the handle bar causes the steering movement of the front wheel;
wherein the steering bar is mounted in a headstock at its lower end supporting the steering bar for rotation about a generally vertical axis and wherein the front wheel is mounted in a front fork which is inclined forwardly and downwardly from the headstock to the axle of the front wheel which is mounted forwardly of headstock with the front fork pivotal in a steering action about an axis longitudinal to the fork at an angle inclined downwardly and forwardly relative to the generally vertical axis of the steering bar and wherein the steering bar is connected to the fork by a drive coupling which converts the rotation of the steering bar about the generally vertical axis to the rotation of the fork about the inclined axis.

12. The scooter according to claim 11 wherein the inclined angle is of an optimum order between 30 and 60 degrees.

13. A scooter comprising:
a platform for receiving at least one foot of a rider standing on the platform;
a front wheel for supporting a forward end of the platform;
a rear wheel for supporting a rearward end of the platform;
a steering mounting for supporting the front wheel for steering movement relative to the platform;
a steering bar having a transverse handle bar at the top and standing upwardly from a position adjacent a front of the platform and connected to the steering mounting so that rotational movement of the steering bar applied by the rider to the handle bar causes the steering movement of the front wheel;
a rear case portion having a hollow interior for receiving the rear wheel and a rear part of the platform;
a front case portion having a hollow interior for receiving the front wheel, the steering mounting and a front part of the platform;
the front and rear case portions being movable between an erected position in which the front and rear case portions are spaced and expose a center part of the platform on which the rider can stand and a folded position in which the front and rear case portions are brought together to form a common case structure containing the scooter for transportation.

14. The scooter according to claim 13 wherein the front and rear case portions each have an opening facing toward the other of the front and rear case portions so that in the folded position the openings are brought together and closed.

15. The scooter according to claim 13 wherein the platform is collapsible so as to allow the front and rear case portions to move together.

16. The scooter according to claim 15 wherein the front part and a rear part of the platform are connected by a transverse hinge thereacross which allows the rear part to be folded relative to the front part through an angle of the order of 180 degrees from an operating position generally co-planar with the front part to a folded position generally parallel to the front part.

17. The scooter according to claim 16 wherein the rear part of the platform is mounted for pivotal movement around a pivot axis defined on the rear case portion and wherein the front part of the platform is mounted for pivotal movement around a pivot axis defined on the front case portion.

18. The scooter according to claim 17 wherein the rear wheel is mounted on a rear wheel mounting member pivotally mounted on the rear case portion at a rear pivot axis and wherein there is provided a link between the rear part of the platform and the rear wheel mounting member such that the pivotal movement of the rear part of the platform relative to the rear case portion causes the link to effect pivotal movement of the rear wheel around the rear pivot axis to a folded position within the rear case portion; and wherein the front wheel is mounted on a front wheel mounting member pivotally mounted on the front case portion at a front pivot axis and wherein there is provided a link between the front part of the platform and the front wheel mounting member such that the pivotal movement of the front part of the platform relative to the front case portion causes the link to effect pivotal movement of the front wheel around the front pivot axis to a folded position within the front case portion.

19. The scooter according to claim 18 wherein there is provided a motor which is fixed within the rear case portion and wherein there is provided a first and a second sprocket carried on the rear case portion at the rear pivot axis and the motor drives a first continuous drive member extending around the first sprocket and the wheel is driven by a second continuous drive member extending around the second sprocket.

20. The scooter according to claim 13 wherein the steering bar includes at least a portion thereof which is separable and connects to the front and rear case portion as a handle therefor.

* * * * *